(12) United States Patent
Liu et al.

(10) Patent No.: US 11,331,729 B2
(45) Date of Patent: May 17, 2022

(54) WHEEL HUB SPECIAL DRILLING DEVICE

(71) Applicant: CITIC Dicastal Co., LTD, Qinhuangdao (CN)

(72) Inventors: Xiao Liu, Qinhuangdao (CN); Jiandong Guo, Qinhuangdao (CN)

(73) Assignee: CITIC Dicastal Co., LTD, Qinhuangdao (CN)

( * ) Notice: Subject to any disclaimer, the term of this patent is extended or adjusted under 35 U.S.C. 154(b) by 38 days.

(21) Appl. No.: 16/746,940

(22) Filed: Jan. 19, 2020

(65) Prior Publication Data
US 2021/0121966 A1 Apr. 29, 2021

(30) Foreign Application Priority Data
Oct. 23, 2019 (CN) .......................... 201911011550.2

(51) Int. Cl.
| | | |
|---|---|---|
| *B23B 41/00* | (2006.01) | |
| *B23B 39/06* | (2006.01) | |
| *B23Q 3/06* | (2006.01) | |
| *B23B 39/00* | (2006.01) | |
| *B23Q 9/00* | (2006.01) | |

(52) U.S. Cl.
CPC ................ *B23B 41/00* (2013.01); *B23Q 3/06* (2013.01); *B23B 39/006* (2013.01); *B23B 39/06* (2013.01); *B23B 2215/08* (2013.01); *B23Q 9/0064* (2013.01)

(58) Field of Classification Search
CPC ... B23B 39/006; B23B 39/06; B23B 2215/08; B23B 41/00; B23Q 9/0064; B23Q 9/0071; B23Q 1/28; B23Q 1/285; B23Q 1/42; B23Q 3/06
See application file for complete search history.

(56) References Cited

U.S. PATENT DOCUMENTS

| | | | | |
|---|---|---|---|---|
| 7,467,449 B1* | 12/2008 | Lee | .......................... | B23B 39/06 29/26 A |
| 8,172,489 B2* | 5/2012 | Prust | ................. | B23B 31/16275 408/132 |
| 2015/0078847 A1* | 3/2015 | Hanks | .................... | B23Q 39/04 408/1 R |
| 2019/0143421 A1* | 5/2019 | Kunkel | ................. | B23B 39/003 408/1 R |

FOREIGN PATENT DOCUMENTS

CN 108994362 A * 12/2018

OTHER PUBLICATIONS

Machine Translation, CN 108994362 A. (Year: 2018).*

* cited by examiner

*Primary Examiner* — Chwen-Wei Su
(74) *Attorney, Agent, or Firm* — Yong Chen

(57) ABSTRACT

A wheel hub special drilling device comprises a main shaft transmission device, which has a transmission mechanism base and a transmission mechanism mounted on the transmission mechanism base, wherein the transmission mechanism comprises an X-axis transmission mechanism, a Y-axis transmission mechanism and a Z-axis transmission mechanism which are used for respectively moving a main shaft in three vertical axial directions; a main shaft, which is mounted on the vertical Z-axis transmission mechanism; a drilling tool, which is mounted on the main shaft and is rotationally driven by the main shaft; a clamp device, which is used for clamping and fixing a wheel hub to be processed.

8 Claims, 3 Drawing Sheets

WHEEL HUB SPECIAL DRILLING DEVICE

CROSS-REFERENCE TO RELATED APPLICATIONS

The present application claims the priority of Chinese patent application No. 201911011550.2, filed on Oct. 23, 2019, which is hereby incorporated by reference in its entirety.

TECHNICAL FIELD

The disclosure relates to the technical field of wheel hub drills, in particular to a wheel hub special drilling device.

BACKGROUND

The machining of the cast aluminum alloy wheel hub usually adopts a three-step machining mode, wherein the first step and the second step adopt a single-station three-axis vertical lathe or horizontal lathe to carry out turning machining, and the third step carries out drilling machining; and because the direction of the valve hole on the wheel hub usually forms an angle with the direction of the bolt hole, the third step usually adopts a single-station four-axis machining center to carry out drilling machining, and for a wheel type with a large number of bolt holes and decorative holes and a large machining amount, the third step of drilling machining will take a large amount of time which exceeds the respective machining time of the first step and the second step, thus prolonging the overall machining beat of this wheel type.

For the three-step machine tool, it is necessary to research and develop a wheel hub special drilling device with double-station, so that when one station processes the wheel hub, the other station performs auxiliary operations such as clamping the wheel hub, thus reducing auxiliary time, and improving efficiency. At present, some European and American machine tool manufacturers have put forward a four-axis machining center with double-station, but there is a disadvantage that the feeding axis X-axis stroke is too long, resulting in a relatively low precision.

SUMMARY

The object of the present disclosure is to provide a wheel hub special drilling device, which solves the above existing problems.
Therefore, the disclosure proposes a wheel hub special drilling device, wherein the wheel hub special drilling device comprises a main shaft transmission device, which has a transmission mechanism base and a transmission mechanism mounted on the transmission mechanism base, wherein the transmission mechanism comprises an X-axis transmission mechanism, a Y-axis transmission mechanism and a Z-axis transmission mechanism which are used for respectively moving a main shaft in three vertical axial directions;
a main shaft, which is mounted on the vertical Z-axis transmission mechanism;
a drilling tool, which is mounted on the main shaft and is rotationally driven by the main shaft;
a clamp device, which is used for clamping and fixing a wheel hub to be processed; the clamp device includes: a clamp seat and at least two clamps for clamping and fixing the wheel hub, wherein the at least two clamps are arranged on the clamp seat side by side along the conveying direction of the wheel hub; and
a first driving device, which drives the clamp seat together with the at least two clamps arranged on the clamp seat to move and switch between a machining position and a clamping position of the clamp device.

In a preferred embodiment, the wheel hub special drilling device further comprises a positioning device for the clamp seat, the positioning device comprises at least two pin holes arranged in the clamp seat and at least one positioning pin inserted into the at least two pin holes, wherein the at least one positioning pin positions the at least two clamps in the machining positions of the clamp device respectively.

The clamp seat is driven by the first driving device, and at the same time the at least two clamps arranged on the clamp seat are driven to move, so that the clamps can switch between the machining position and the clamping position of the clamp device, that is, when one clamp is in the processing station to process the wheel hub, the other clamp can carry out auxiliary operations such as clamping the wheel hub, so as to reduce the auxiliary time and improve efficiency.

In a simple configuration, it is preferable to provide exactly two clamps on the base.

In a preferred embodiment, the clamp device further comprises:
a clamp base, wherein a guiding rail is provided on the clamp base, and the clamp seat is mounted on the guiding rail;
the first driving device is used for driving the clamp seat, wherein the first driving device is connected with the clamp seat and thus is capable of driving the clamp seat to reciprocate along the guiding rail on the clamp base. Thus, for example, in case of providing two clamps, the clamp base is driven by the first driving device to move one clamp to the machining station for machining the wheel hub, and the other clamp can perform an auxiliary operation such as clamping the wheel hub in the clamping station.

When finishing the machining, the clamp seat is reversely driven by the first driving device, the wheel hub machined in the machining station is transferred to the clamping station, and the wheel hub prepared in the clamping station is transferred to the machining station. Therefore, the clamp seat is driven to reciprocate by the first driving device, the clamp switches between the machining position and the clamping position of the clamp device, thus achieving the highest production efficiency.

In a preferred embodiment, the clamp base is arranged on the frame of the drilling device or is part of the frame of the drilling device.

In a preferred embodiment, a connecting plate is mounted in a counter bore on the upper surface of the clamp base, guiding posts are uniformly mounted on the connecting plate, and the at least one positioning pin is mounted on the connecting plate; wherein a second driving device for driving the at least one positioning pin is mounted on the lower surface of the clamp base and is fixedly mounted below the connecting plate.

In a preferred embodiment, the Y-axis transmission mechanism is mounted on the transmission mechanism base through the guiding rail, the X-axis transmission mechanism is mounted on the Y-axis transmission mechanism through the guiding rail, and the Z-axis transmission mechanism is mounted on the X-axis transmission mechanism through the guiding rail. Here, the X-axis, the Y-axis, and the Z-axis form three perpendicular axes in a three-dimensional coordinate system. Typically, the movement of the main shaft along the vertical Z-axis is achieved through the Z-axis transmission mechanism.

In a preferred embodiment, the transmission mechanism base is arranged on the frame of the drilling device or is a part of the frame of the drilling device.

In a preferred embodiment, the clamp seat is provided with exactly two clamps, namely a first clamp and a second clamp, which are mounted on the upper surface of the clamp seat one front and one rear along the conveying direction of the wheel hub, and the clamp seat is provided with a first pin hole and a second pin hole respectively corresponding to the first clamp and the second clamp, wherein the first pin hole is used for positioning the first clamp in a machining position, and the second pin hole is used for positioning the second clamp in the machining position.

In a preferred embodiment, the first driving device for driving the clamp seat is constructed as a first cylinder, the output end of which is connected to the clamp seat, and/or the second driving device for driving the at least one positioning pin is constructed as a second cylinder, the output end of which is mounted below the connecting plate.

Through the combination of the above described pin holes, the positioning pin and the cylinder, the automatic and accurate positioning of the clamp seat is achieved by simple parts, thus saving the cost, and meanwhile ensuring the positioning accuracy.

In a preferred embodiment, the stroke of the first driving device has a maximum and a minimum limit position which exactly respectively ensure the position alignment of the first pin hole and the second pin hole in the clamp seat with the at least one positioning pin.

In a preferred embodiment, the stroke of the Y-axis, the X-axis and the Z-axis is 600 mm to 700 mm.

By means of the technical solution provided, compared with the machine tool adopting high-cost and high-precision accessories, the present disclosure adjusts and replaces the two stations by the cylinder, saves the cost by using the precise positioning system with the cylinder, and ensures the positioning precision at the same time, so that when the machining station is machining the wheel hub, the other clamping station can perform auxiliary operations such as clamping the wheel hub, therefore reducing the auxiliary time, and improving the efficiency.

BRIEF DESCRIPTION OF THE DRAWINGS

Embodiments of the present disclosure will be described in detail below with reference to the attached drawings, in which.

Figure 1:
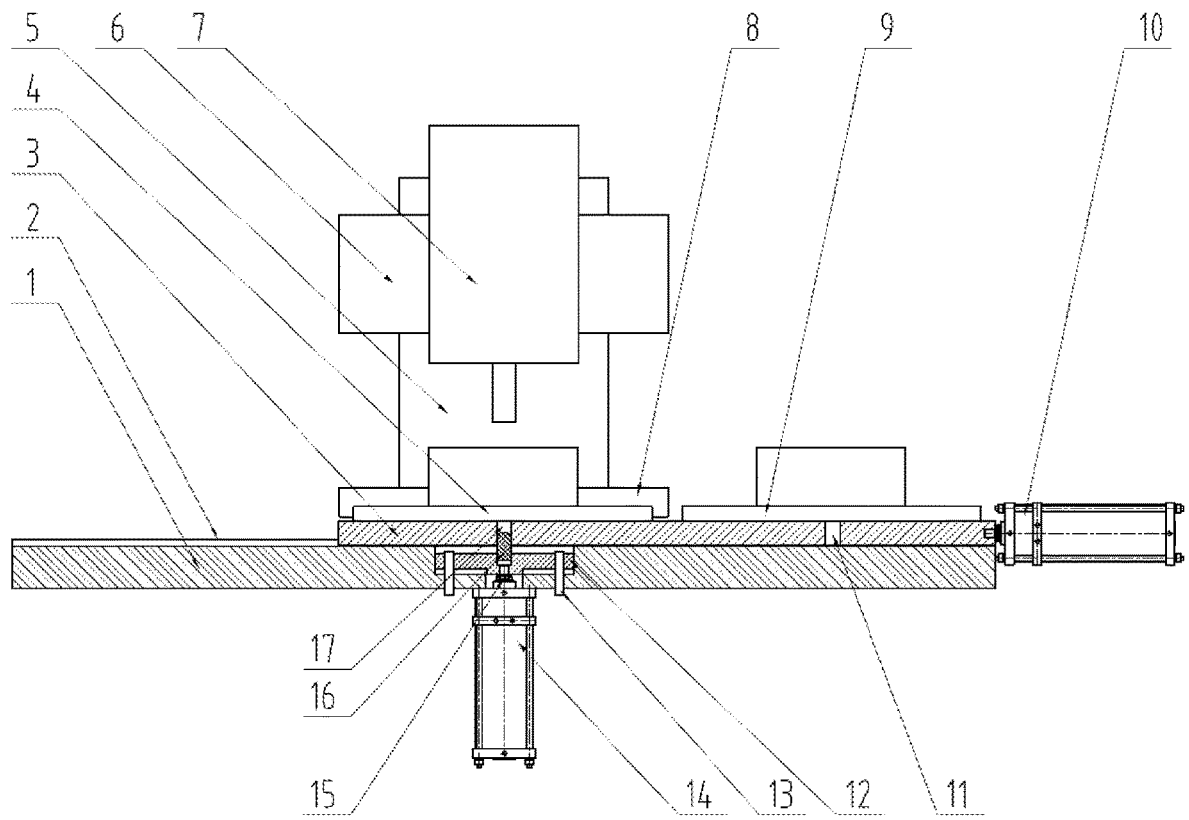
FIG. 1 is a front view of a wheel hub special drilling device according to the present disclosure.

LIST OF REFERENCE NUMERALS 1. clamp base
2. guiding rail
3. clamp seat
4. first clamp
5. Y-axis transmission mechanism
6. X-axis transmission mechanism
7. Z-axis transmission mechanism
8. transmission mechanism base
9. second clamp
10. first cylinder
11. second pin hole
12. connecting plate
13. guiding post
14. second cylinder
15. output end of the second cylinder
16. positioning pin
17. first pin hole
18. main shaft

DETAILED DESCRIPTION OF THE EMBODIMENTS

The disclosure is described in further detail below with reference to the accompanying drawings of a specific embodiment.

FIG. 1 shows a wheel hub special drilling device according to the present disclosure, which comprises a main shaft transmission device. The main shaft transmission device has a transmission mechanism base 8 and a transmission mechanism mounted on the transmission mechanism base 8, wherein the transmission mechanism comprises an X-axis transmission mechanism 6, a Y-axis transmission mechanism 5 and a Z-axis transmission mechanism 7 which are used for respectively moving a main shaft in three vertical axial directions.

Figure 3:
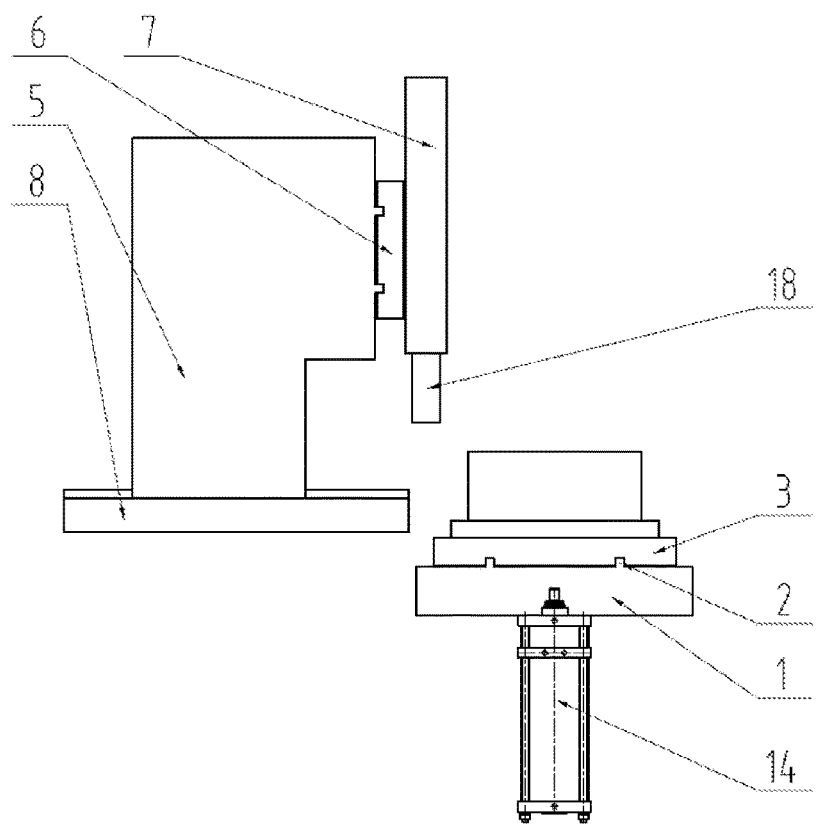
FIG. 3 is a side view of the wheel hub special drilling device according to the present disclosure.
Figure 4:
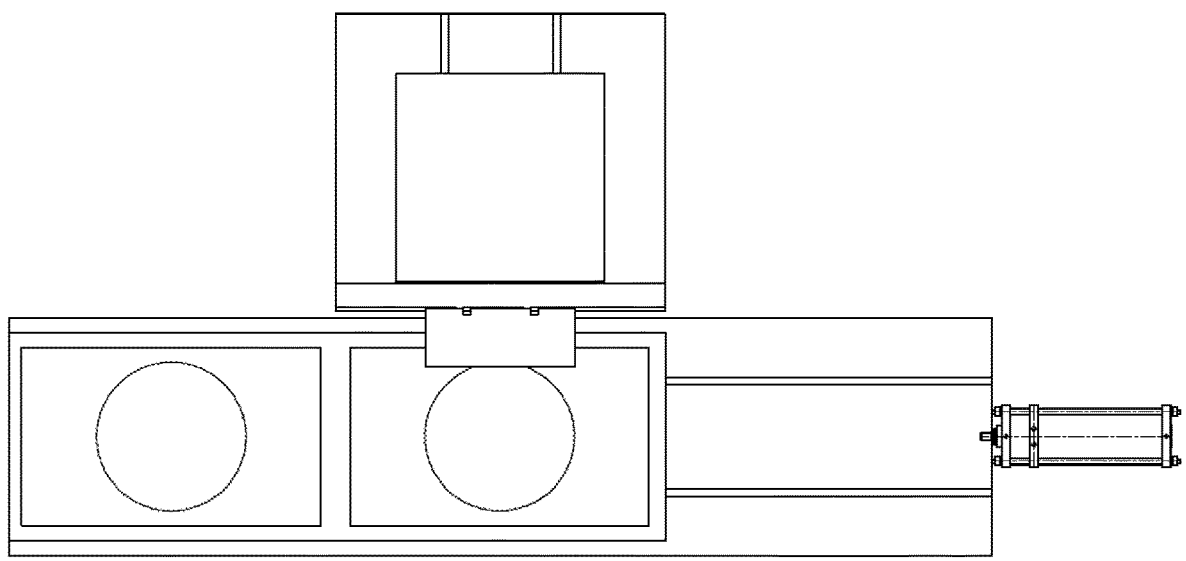
FIG. 4 is a schematic view of the left limiting position (maximum limiting position) of the present disclosure.

In this embodiment, as shown in FIGS. 3 and 4, the Y-axis transmission mechanism 5 is mounted on the transmission mechanism base 8, the X-axis transmission mechanism 6 is mounted on the Y-axis transmission mechanism 5, the Z-axis transmission mechanism 7 is mounted on the X-axis transmission mechanism 6, and the main shaft 18 is mounted on the Z-axis transmission mechanism 7. Here, the X-axis, the Y-axis, and the Z-axis form three perpendicular axes in a three-dimensional coordinate system.

Here, the X-axis is the direction in which the clamp is moved and the wheel hub is conveyed, and the Z-axis transmission mechanism achieves the movement of the main shaft along the vertical Z-axis. The main shaft 18 is mounted on the described vertical Z-axis transmission mechanism 7. The drilling tool is mounted on the main shaft 18 and is rotationally driven by the main shaft 18.

Preferably, the present disclosure requires stroke of the Y-axis, the X-axis and the Z-axis to be 600 mm to 700 mm, and need not be designed to be 1000 mm to 2000 mm or other stroke ranges.

In this embodiment, the wheel hub special drilling device according to the present disclosure further comprises a clamp device for clamping and fixing the wheel hub to be machined. Wherein, the clamp device comprises a clamp seat 3 and at least two clamps for clamping and fixing the wheel hub. In the present embodiment, for example, two clamps are provided, namely a first clamp 4 and a second clamp 9, wherein the first clamp 4 and the second clamp 9 are arranged on the clamp seat 3 side by side along the conveying direction of the wheel hub.

Of course, according to the requirement, three, four or even more clamps can also be provided, which are arranged in sequence along the direction of conveying the wheel hub or moving the clamps, so that according to the present disclosure, the switch, between the machining position and the clamping position of the clamp device, based on the machining beat is achieved, therefore improving the production efficiency.

The clamp device further comprises a clamp base 1, wherein a guiding rail 2 is provided on the clamp base 1, and the clamp seat 3 is mounted on the guiding rail 2. A first driving device used for driving the clamp seat 3 is further provided, wherein the first driving device is connected with the clamp seat 3 and thus is capable of driving the clamp seat 3 to reciprocate along the guiding rail 2 on the clamp base 1.

Figure 6:
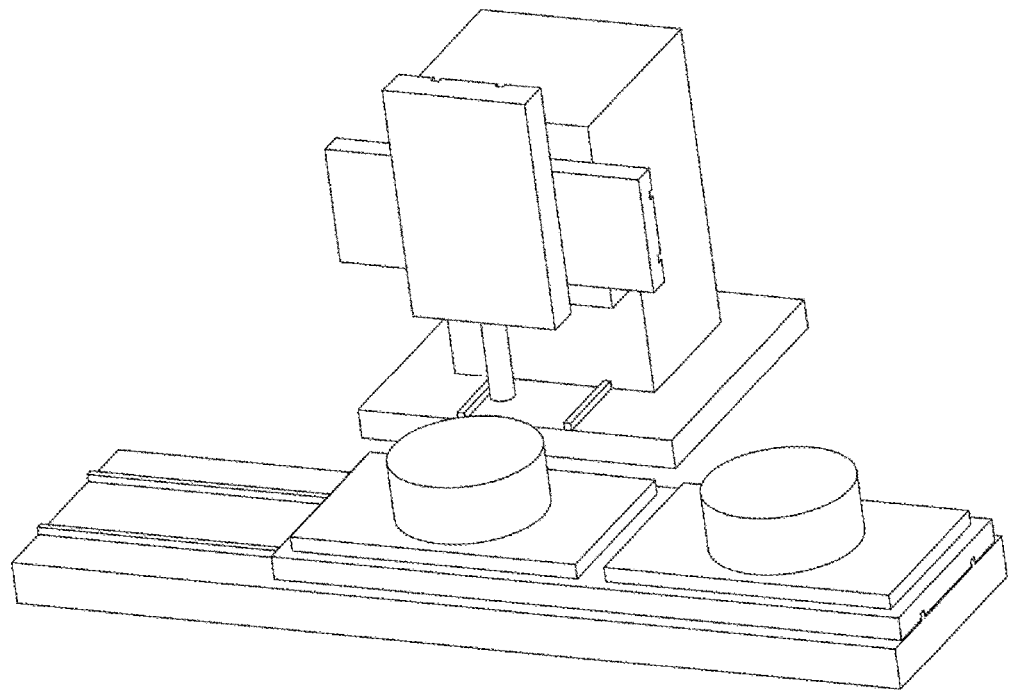
FIG. 6 is a three-dimensional spatial schematic view (excluding the cylinder) of a wheel hub special drilling device according to the present disclosure.

Specifically, as best shown in FIG. 6, the guiding rail 2 is mounted on the clamp base 1 and the clamp seat 3 is mounted on the guiding rail 2. The first clamp 4 and the second clamp 9 are respectively mounted at the two sides of the upper surface of the clamp seat 3.

In this embodiment, the clamp device further comprises a first driving device which drives the clamp seat 3 to move together with the first clamp and the second clamp arranged on the clamp seat 3 and enables the first clamp and the second clamp to be switched between the machining position and the clamping position of the clamp device.

Preferably, the first driving device for driving the clamp seat 3 is constructed as a first cylinder 9, the output end of which is connected to the clamp seat 3, and/or the second driving device for driving the at least one positioning pin 16 is constructed as a second cylinder 14, the output end 15 of which is mounted below the connecting plate 12.

In this embodiment, the first cylinder 10 is mounted on the side of the clamp base 1, and the output end of the first cylinder 10 is mounted and fixed on the clamp seat 3.

According to the present disclosure, the wheel hub special drilling device special further comprises a positioning device for the clamp seat 3, wherein the positioning device comprises at least two pin holes arranged in the clamp seat 3 and at least one positioning pin 16 inserted into the at least two pin holes, wherein the at least one positioning pin 16 respectively positions the at least two clamps in the machining positions of the clamp device.

Figure 2:
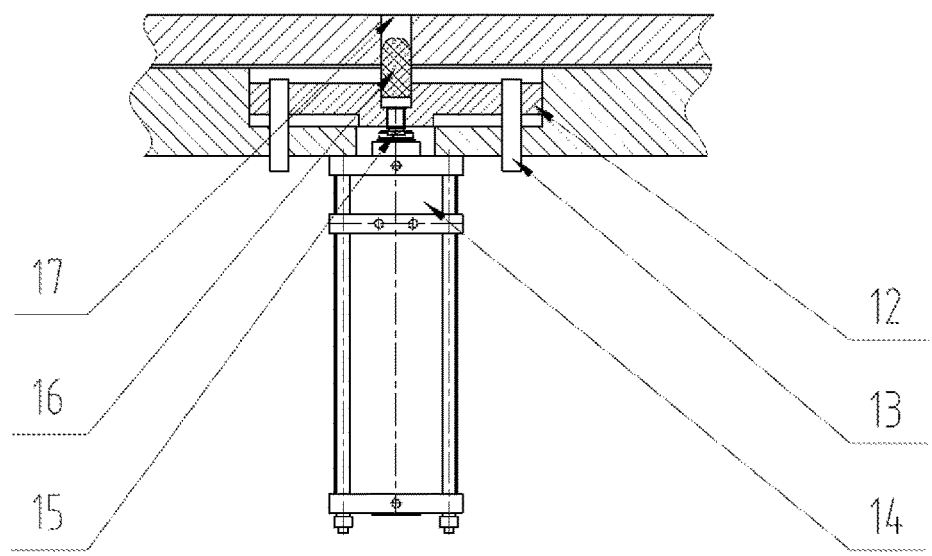
FIG. 2 is a partial schematic view of a positioning portion of the present disclosure.

In this embodiment, as shown in FIG. 2, the two sides of the clamp seat 3 is symmetrically designed with a first pin hole 17 and a second pin hole 11, the second cylinder 14 is mounted on the lower surface of the clamp base 1, the connecting plate 12 is mounted in a counter bore on the upper surface of the clamp base 1, guiding posts 13 are uniformly mounted on the connecting plate 12, the positioning pin 16 is mounted at a counter bore at the upper end of the connecting plate 12, and the output end 15 of the second cylinder is fixedly mounted at the lower end of the connecting plate 12.

In actual use, the first cylinder 10 pushes the first clamp 4 or the second clamp 9 to the machining position of the clamp base 1 through the clamp seat 3, the output end 15 of the second cylinder 14 pushes the connecting plate 12 to move upwards, and the connecting plate 12, under the guidance of the guiding post 13, ensures that the positioning pin 16 vertically enters the first pin hole 17 or the second pin hole 11, so that the positions of the first clamp 4 and the second clamp 9 in the X direction are accurately positioned.

Figure 5:
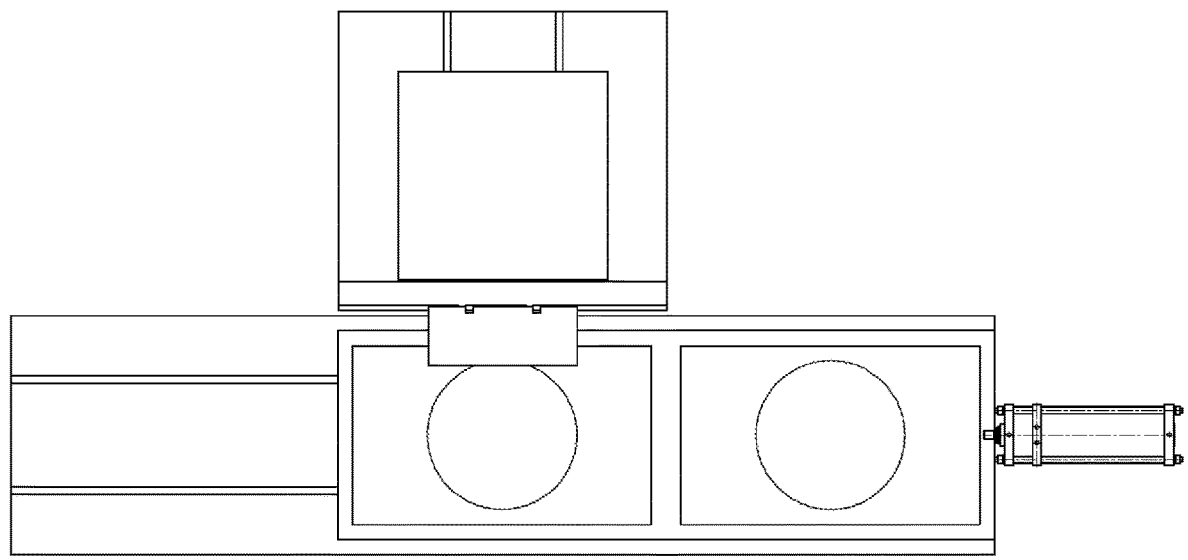
FIG. 5 is a schematic illustration of the right limiting position (minimum limiting position) of the present disclosure.

After the wheel hub machining of the corresponding stations of the first clamp 4 and the second clamp 9 is completed, the second cylinder 14 drives the positioning pin 16 to descend and extend out of the first pin hole 17 or the second pin hole 11, as shown in FIGS. 4 and 5, the first cylinder 10 pushes the second clamp 9 or the first clamp 4 to the machining position of the clamp base 1 through the clamp seat 3, and then the second cylinder 14 positions the clamp seat 3 again.

Preferably, the maximum and minimum limiting positions corresponding to the stroke of the first cylinder 10 of the present disclosure exactly ensure the position alignment of the first pin hole 17 or the second pin hole 11 with the positioning pin 16, and finally the precise positioning is carried out by the positioning pin 16.

Preferably, when the wheel hub machining is carried out on the station corresponding to the first clamp 4 or the second clamp 9, the operation of auxiliary actions such as dismounting, mounting and clamping of the wheel hub and the like is carried out on the other station, and the auxiliary time is saved.

Compared with a machine tool adopting high-cost and high-precision accessories, the machine tool provided by the present disclosure has the advantages that two stations are adjusted and replaced through the cylinder, the cost is saved by using the precise positioning system with the cylinder, and the positioning precision is also ensured. Therefore, when one machining station is used for machining the wheel hub, the other clamping station is used for auxiliary operations such as clamping the wheel hub, therefore reducing the auxiliary time, and improving the efficiency.

What is claimed is:

1. A wheel hub special drilling device, comprising:
   a main shaft transmission device, which has a transmission mechanism base and a transmission mechanism mounted on the transmission mechanism base, wherein the transmission mechanism comprises an X-axis transmission mechanism, a Y-axis transmission mechanism and a Z-axis transmission mechanism which are used for respectively moving a main shaft in three vertical axial directions;
   a main shaft, which is mounted on the vertical Z-axis transmission mechanism;
   a drilling tool, which is mounted on the main shaft and is rotationally driven by the main shaft; and
   a clamp device, which is used for clamping and fixing a wheel hub to be processed;
   wherein the clamp device includes:
   a clamp seat and at least two clamps for clamping and fixing the wheel hub, wherein the at least two clamps are arranged on the clamp seat side by side along the conveying direction of the wheel hub;
   a clamp base, wherein the clamp seat is disposed on the clamp base;
   a positioning device for the clamp seat, the positioning device comprises at least two pin holes arranged in the clamp seat and at least one positioning pin inserted into the at least two pin holes, wherein the at least one positioning pin positions the at least two clamps in the machining positions of the clamp device respectively;
   a first driving device, which drives the clamp seat together with the at least two clamps arranged on the clamp seat to move and switch between a machining position and a clamping position of the clamp device; and
   a second driving device for driving the at least one positioning pin, mounted on the lower surface of the clamp base.

2. The wheel hub special drilling device according to claim 1, wherein the clamp device further comprises:
   a guiding rail is provided on the clamp base, and the clamp seat is mounted on the guiding rail; and
   the first driving device is used for driving the clamp seat, wherein the first driving device is connected with the clamp seat and thus is capable of driving the clamp seat to reciprocate along the guiding rail on the clamp base.

3. The wheel hub special drilling device according to claim 2, wherein a connecting plate is mounted in a counter bore on the upper surface of the clamp base, guiding posts are uniformly mounted on the connecting plate, and the at least one positioning pin is mounted on the connecting plate; wherein the second driving device for driving the at least one positioning pin is fixedly mounted below the connecting plate.

4. The wheel hub specific drilling device according to claim 3, wherein the first driving device for driving the clamp seat is constructed as a first cylinder, the output end of which is connected to the clamp seat, and/or the second driving device for driving the at least one positioning pin is constructed as a second cylinder, the output end of which is mounted below the connecting plate.

5. The wheel hub special drilling device according to claim 2, wherein the transmission mechanism base and/or the clamp base are/is mounted on the frame of the drilling device or are/is a part of the frame of the drilling device.

6. The wheel hub special drilling device according to claim 1, wherein the clamp seat is provided with the at least two clamps including a first clamp and a second clamp, which are mounted on the upper surface of the clamp seat one front and one rear along the conveying direction of the wheel hub, and the clamp seat is provided with a first pin hole and a second pin hole respectively corresponding to the first clamp and the second clamp, wherein the first pin hole is used for positioning the first clamp in a machining position, and the second pin hole is used for positioning the second clamp in the machining position.

7. The wheel hub specific drilling device according to claim 6, wherein the stroke of the first driving device has a maximum and a minimum limit position which exactly respectively ensure the position alignment of the first pin hole and the second pin hole in the clamp seat with the at least one positioning pin.

8. The wheel hub special drilling device according to claim 1, wherein the stroke of the Y-axis, the X-axis and the Z-axis is 600 mm to 700 mm.

* * * * *